United States Patent [19]
Apecetche et al.

[11] Patent Number: 6,001,478
[45] Date of Patent: Dec. 14, 1999

[54] RESIN PARTICLE PRODUCED BY DIENE POLYMERIZATION WITH RARE EARTH AND TRANSITION METAL CATALYSTS

[75] Inventors: Maria Angelica Apecetche, Piscataway; Kevin Joseph Cann, Rocky Hill; Minghui Zhang, Bridgewater, all of N.J.

[73] Assignee: Union Carbide Chemicals & Plastics Technology Corporation, Danbury, Conn.

[21] Appl. No.: 08/907,767

[22] Filed: Aug. 8, 1997

[51] Int. Cl.$^6$ ...................................................... B32B 25/16
[52] U.S. Cl. ........................... 428/407; 428/402; 524/789; 524/856; 526/114; 526/115; 526/116; 526/164; 526/901; 526/904
[58] Field of Search ..................................... 526/114, 115, 526/116, 164, 901, 904; 523/207; 428/402, 407; 524/789, 856

[56] References Cited

U.S. PATENT DOCUMENTS

| | | | |
|---|---|---|---|
| 3,297,667 | 1/1967 | von Dohlen et al. | 526/164 X |
| 4,102,817 | 7/1978 | Throckmorton et al. | 526/140 X |
| 4,663,405 | 5/1987 | Throckmorton et al. | 526/164 X |
| 4,699,960 | 10/1987 | Gordini et al. | 526/164 X |
| 4,994,534 | 2/1991 | Rhee et al. | 526/88 |
| 5,412,045 | 5/1995 | Osman et al. | 526/133 |
| 5,428,119 | 6/1995 | Knauf et al. | 526/164 X |
| 5,453,471 | 9/1995 | Bernier et al. | 526/68 |
| 5,567,784 | 10/1996 | Weider et al. | 526/164 |
| 5,652,304 | 7/1997 | Calderon et al. | 526/162 |

FOREIGN PATENT DOCUMENTS

| | | |
|---|---|---|
| 0736549 | 10/1996 | European Pat. Off. . |
| 96/04323 | 2/1996 | WIPO . |
| WO 96/04322 | 2/1996 | WIPO . |

*Primary Examiner*—Fred Teskin
*Attorney, Agent, or Firm*—B. L. Deppenbrock

[57] ABSTRACT

There is provided a process for preparing a polydiene comprising polymerizing a diene selected from the group consisting of butadiene, isoprene, or a mixture thereof under polymerization conditions in a gas phase reactor optionally in the presence of an inert particulate material and in the presence of a catalyst comprising (i) a rare earth metal component, (ii) a transition metal component selected from the group consisting of nickel compound, cobalt compound or titanium compound, and (iii) cocatalyst.

2 Claims, No Drawings

RESIN PARTICLE PRODUCED BY DIENE POLYMERIZATION WITH RARE EARTH AND TRANSITION METAL CATALYSTS

FIELD OF THE INVENTION

The present invention relates to fluidized homo- and co-polymerizations of dienes using a catalyst containing a lanthanide metal component and a transition metal component. More particularly, the present invention relates to gas phase polymerization of butadiene, isoprene, and mixtures of them using a catalyst precursor comprising a lanthanide metal compound and a transition metal compound along with at least one organometallic cocatalyst.

BACKGROUND OF THE INVENTION

Commercially, polybutadiene, polyisoprene, and copolymers of butadiene and isoprene have been prepared from solution or bulk polymerization processes using a transition metal catalyst such as those having a precursor component of a nickel or cobalt compound or using a rare earth metal catalyst such as those having a precursor component of a neodymium compound. In solution or bulk polymerizations using almost any cobalt or nickel transition metal catalyst or any neodymium rare earth metal catalyst, the polymers produced have commercial range molecular weights (MW), and narrow molecular weight distributions (MWD). In these bulk and solution polymerization procedures, shorter residence time, chain transfer agent addition, and/or higher reaction temperature are used to control MW and/or MWD. Due to process limitations in the solution system the ranges of polymer molecular weight and MWD are restricted. The commercial polymers produced in solution and slurry processes are produced from the reactor in bale-like form and require additonal pulverization steps.

Only recently, it has been discovered that polybutadiene and polyisoprene can be prepared in the gas phase, particularly in the gas phase fluidized bed reactor. See U.S. Pat. Nos. 4,994,534; 5,453,471; and also WO 96/04322; and WO 96/04323. Unfortunately, many of the catalysts employed in solution/bulk polymerizations, when used in fluidized reactors, particularly gas phase fluidized reactors, produce polymers having low MW, and narrow MWD.

Accordingly, there is an ongoing need to be able to utilize these catalysts in fluidized polymerization processes to produce polymers (e.g., polybutadiene, polyisoprene, and copolymers of butadiene and isoprene) having any desired molecular weights and MWD, especially molecular weights and MWD equivalent to commercially available polymers produced by solution/bulk polymerizations processes. In addition, there is a need to utilize these same catalysts in gas phase polymerizations to produce polymers with much higher molecular weights and broad or bimodal MWD. This is believed to be necessary because it is thought that by increasing the MWD of the polymer, subsequent end-use processing would become easier (see EP 754,705-A2 and an article by E. Lauretti, B. Miani, and F. Mistrali in *Tire Technology International*, 1993, pp. 72–78).

SUMMARY OF THE INVENTION

The present invention provides a process for polymerizing a polydiene, which process comprises polymerizing a diene selected from the group consisting of butadiene, isoprene, or a mixture thereof under polymerization conditions in a gas phase reactor using a catalyst comprising (i) a lanthanide component, (ii) a transition metal component, and (iii) cocatalyst. Preferably an inert particulate material is also employed in the polymerization.

The process also produces a novel resin particle which is granular and free-flowing comprising an outer shell having a mixture of an inert particulate material and a polymer selected from the group consisting of polybutadiene, polyisoprene, or a butadiene-isoprene copolymer; said inert particulate material being present in said outer shell in an amount higher than 75% by weight based on the weight of said outer shell; and an inner core having a mixture of said polymer and said inert particulate material, said polymer being present in the inner core in an amount higher than 90% by weight based on the weight of said inner core; and wherein the resin particle has a residue of rare earth metal ranging from about 10 to 400 ppm based upon the total polymer and a residue of a transition metal selected from the group consisting of nickel, cobalt, titanium and mixtures thereof ranging from about 1 to 120 ppm based upon total polymer weight. The total polymer weight is defined as including the inert particulate material incorporated in the polymer.

DETAILED DESCRIPTION OF THE INVENTION

Polymers Produced. The polymers produced by the present invention can include polybutadiene, polyisoprene, and butadiene-isoprene copolymers. The polymer molecular weights (MW) can vary from a weighted average of molecular weight of 200,000 to 2,000,000. The MWD is evidenced by a dispersity index (also known as a polydispersity index) varying between 3 and 20.

Monomers Employed. Monomers employed in the process of the present invention include butadiene (e.g., 1,3 butadiene and/or 1,4-butadiene, preferably 1,3-butadiene), isoprene, and mixtures of isoprene and butadiene.

Catalyst System. The mixed lanthanide-transition metal catalyst system employable in the present invention contains a lanthanide or rare earth metal component, and transition metal component, appropriate cocatalyst(s), and optionally one or more promoters.

The rare earth metal component and transition metal component can each be supported on a support material such as silica, carbon black, or alumina; unsupported in a liquid form as in a solution, slurry, suspension, or dispersion; spray dried in the presence or absence of a filler; or used in the form of a prepolymer.

The rare earth metal component and the transition metal component can be impregnated on the same support or different supports. Preferably, the rare earth metal component and the transition metal component are co-impregnated on a single support material.

In the present invention, other variations are also contemplated. For example, the rare earth metal component and the transition metal component can both be unsupported and prepolymerized. Or, the rare earth metal component can be impregnated on a support and the transition metal component can be prepolymerized. Also, the rare earth metal component can be prepolymerized and the transition metal component can be impregnated on a support. And, the rare earth metal component can be unsupported and solubilized or slurried, while the transition metal component can be supported or prepolymerized.

A single cocatalyst (e.g., methylaluminoxane or modified methylaluminoxane) that is compatible with both the lanthanide component and the transition metal component can be used. Or, alternatively, two or more different cocatalysts can be employed so long as at least one is pre-reacted or prepolymerized with either the transition metal component or the lanthanide (rare earth) component before the other metal component is contacted. The cocatalyst(s) employed in conjunction with the rare earth metal component and the transition metal component is a compound selected from the group consisting of an alkyl aluminum, an alkyl aluminum hydride, an alkyl aluminum halide, an aluminoxane including modified aluminoxane, and mixtures thereof.

Lanthanide Component. The practice of this invention is not limited to any particular class of rare earth metal component. Rare earth compounds that have been previously employed in slurry, solution, or bulk polymerizations of higher boiling or readily condensable monomers (e.g., butadiene and isoprene), as well as their supported counterparts, are utilized in this invention. The rare earth metal component can be a rare earth compound or a mixture of two or more rare earth metal compounds and optionally can have a Lewis acid component and/or promoter.

The rare earth metal component can be any compound, organic or inorganic, of a metal chosen from those of Group IIIB of the Periodic System having an atomic number of between 57 and 103 can be employed herein. Examples of rare earth metal compounds are compounds of cerium, lanthanum, praseodymium, gadolinium and neodymium. Of these compounds, carboxylates, alcoholates, acetylacetonates, halides (including ethers, esters, amines, alcohols, and pyridine complexes of neodymium trichloride), and allyl derivatives of the metals are preferred. Neodymium compounds are the most preferred. Illustrative neodymium compounds can include neodymium naphthenate, neodymium octanoate, neodymium octoate, neodymium trichloride, neodymium trichloride complexes formed with tetrahydrofuran (e.g., $NdCl_3(THF)_2$) and ethanol (e.g., $(NdCl_3(EtOH)_3)$), neodymium 2,2-diethylhexanoate, neodymium 2-ethylhexoate, neodymium 2-ethyloctoate, neodymium 2,2-diethyl heptanoate, allyl neodymium dichloride, bis-allyl neodymium chloride, and tris-allyl neodymium. Neodymium neodecanoate, octanoate, or versatate and π-allyl-neodymium chloride complexes give particularly good results. When the rare earth metal compound employed in the polymerization is a rare earth (e.g., neodymium) carboxylate, alcoholate, or acetylacetonate compound, it must be contacted with a halogen-containing promoter.

Halogen-containing promoters that can be used in the rare earth metal component include compounds Lewis acids such as $BCl_3$, $AlCl_3$, ethylaluminum dichloride, ethylaluminum sequichloride, diethylaluminum chloride, and other alkyl radical derivatives of these compounds. They can be organohalide derivatives of the formula:

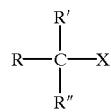

in which X is Cl or Br, R is hydrogen, alkyl, aryl, alkylaryl, chloro or bromo alkyl, alkoxy or epoxy; R' is alkyl, aryl, H, Cl or Br; R" is alkyl, aryl, chloro- or bromo- alkyl, chloro- or bromo- aryl, vinyl, Cl or Br; or R'+R" is oxygen, or saturated or unsaturated cycloalkyl. If R=R'=H, then R" is only of aromatic nature. The alkyl radicals can be either saturated or unsaturated, linear or branched, and contain from 1 to 18 carbon atoms.

Typical examples of organohalide derivatives which can be used as halide-containing promoter components of the present invention are benzoyl, propionyl, benzyl, benzylidene or tertiary butyl chlorides or bromides, methyl chloroformate or bromoformate, chlorodiphenylmethane or chlorotriphenylmethane, and the like.

When the rare earth metal component is supported, typical supports can include, for example, silica, carbon black, porous crosslinked polystyrene, porous crosslinked polypropylene, alumina, or magnesium chloride support materials. Of these support materials, carbon black and silica, and mixtures of carbon black and silica are preferred. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 Angstroms, preferably at least about 200 Angstroms. Generally, the amount of support used is that amount which will provide about 0.1 to about 1.0 millimole of rare earth metal per gram of support. In another preferred embodiment, two types of carbon black are used as support material(s). DARCO G-60 (pH of water extract=5) is used as dry powder having a surface area of 505 square meters per gram, average particle size of 100 microns, and porosity of 1.0 to 1.5 cubic centimeter per gram. NORIT A (pH of water extract=9–11) used as a dry powder has a surface area of 720 square meters per gram, average particle size of 45 to 80 microns. These supports are available from the Aldrich Chemical Company, Inc. (Milwaukee, Wis.).

Preferred co-catalysts that can be employed with the rare earth metal component include compounds such as triethylaluminum (TEAL), triisobutylaluminum (TIBA), trihexylaluminum (THAL), methylaluminoxane (MAO), modified methylaluminoxane (MMAO), trimethylaluminum (TMA), a dialkyl aluminum hydride or a mixture of a dialkyl aluminum hydride and a trialkyl aluminum.

When MAO or MMAO is employed as the co-catalyst, it may be activated by one of the following: (a) branched or cyclic oligomeric poly(hydrocarbylaluminum oxide)s which contain repeating units of the general formula —(Al(R''') O)—, where R''' is hydrogen, an alkyl radical containing from 1 to about 12 carbon atoms, or an aryl radical such as a substituted or unsubstituted phenyl or naphthyl group; (b) ionic salts of the general formula $[A^+][BR^*_4{}^-]$, where $A^+$ is a cationic Lewis or Bronsted acid capable of abstracting an alkyl, halogen, or hydrogen from the transition metal component of the catalyst, B is boron, and R* is a substituted aromatic hydrocarbon, preferably a perfluorophenyl radical; and (c) boron alkyls of the general formula $BR^*_3$, where R* is as defined above. Aluminoxanes are well known in the art and comprise oligomeric linear alkyl aluminoxanes represented by the formula:

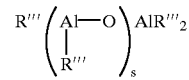

and oligomeric cyclic alkyl aluminoxanes of the formula:

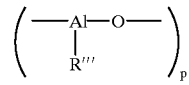

wherein s is 1 to 40, preferably 10 to 20; p is 3 to 40, preferably 3 to 20; and R''' is an alkyl group containing 1 to 12 carbon atoms, preferably methyl or an aryl radical such as a substituted or unsubstituted phenyl or naphthyl radical. Modified methylaluminoxane is formed by substituting 20–80 wt % of the methyl groups with a $C_2$ to $C_{12}$ group, preferably with isobutyl groups, using techniques known to those skilled in the art.

The rare earth metal component of the catalyst can be prepared by mixing the support material, the rare earth metal compound, cocatalyst, optional promoter in any order in an inert solvent or diluent. In general, the rare earth metal compound can be impregnated on a support by means such as by dissolving the rare earth metal compound in a solvent or diluent such as a hydrocarbon or ether (including aliphatic, cycloaliphatic or aromatic compounds such as pentane, isopentane, hexane, cyclohexane, benzene, toluene, and tetrahydrofuran) in the presence of the support material and then removing the solvent or diluent by evaporation such as under reduced pressure. Alternatively, the rare earth metal compound can be dissolved in a solvent or diluent such as a hydrocarbon or tetrahydrofuran and spray dried to generate a well-shaped catalyst precursor having little or no silica or other inorganic solids content, if desired.

A preferred method for making one of the rare earth metal components of this invention involves impregnating a silica support, a carbon black support, or a mixed support of the two with a rare earth metal containing compound. The amount of metal impregnated on the support can range between 0.1 and 1.0 millimoles/g catalyst. An organic alkyl aluminum compound may be added prior, during or subsequent to the impregnation step, either in a hydrocarbon such as those previously mentioned or in an oxygenated solvent such as THF. The rare earth metal component may be isolated as a dry solid or used as a slurry in a diluent. When an unsupported solution or slurry rare earth component is employed, it is prepared and used for polymerization using procedures disclosed in U.S. Pat. Nos. 5,317,306 and/or 5,616,661.

A preferred procedure for making one of the rare earth components of the invention comprises the sequential steps of (A) treating a silica support, carbon black support, or mixture of the two with ethyl aluminum sesquichloride in a hydrocarbon solvent thereby forming a slurry; (B) adding the rare earth compound (a neodymium carboxylate or alcoholate such as neodymium neodecanoate, neodymium octoate, or neodymium versatate) followed by solvent removal.

The rare earth metal component may also be prepared without a support by simple contact of the rare earth compound of the rare earth metal component with the alkyl aluminum compound (or cocatalyst), optionally employing an additional diluent or solvent, to form a solution or slurry which is fed directly to the reactor. The Al to rare earth metal ratio in the catalyst preparation step may vary between 0.5 to 1000. The rare earth metal component may be used without aluminum treatment when an organohalide promoter or aluminum alkyl halide is also fed to the reactor with the cocatalyst. When MAO is used as the cocatalyst, no halide source is required.

Solution rare earth metal components which are most preferred in the process of this invention are (I) a neodymium neodecanoate, neodymium octoate, or neodymium versatate as the metal component, and an organic alkyl aluminum compound such as diethyl aluminum chloride to form the catalyst in a diluent such as n-hexane or cyclohexane; (II) complexes such as allyl neodymium dichloride, bis-allyl neodymium chloride, and tris-allyl neodymium as the metal component and an alumoxane compound such as MAO to form the catalyst in a diluent such as n-hexane, cyclohexane or toluene. The solution rare earth metal components are fed to the reactor with a co-catalyst selected from the group consisting of diisobutyl aluminum hydride (DIBAH), triisobutylaluminum, or a mixture of diisobutyl aluminum hydride and triisobutylaluminum (TIBA). These catalysts are preferred because they have little or no induction period and remain catalytically active for a long period of time.

Transition Metal Component. The transition metal component of the catalyst employed in the process of this invention can include a transition metal compound, a co-catalyst, and optionally a promoter.

The transition metal compound can be a mixture of two or more transition metal compounds. In general, the transition metal compound of the transition metal component of the catalyst can be soluble or insoluble, supported or unsupported, or spray dried in either the presence or absence of a filler. Alternatively, the transition metal component can be introduced to the polymerization zone in the form of a prepolymer.

The transition metal compound can be impregnated on a support by means such as by dissolving the transition metal compound in a solvent or diluent such as a hydrocarbon or tetrahydrofuran in the presence of the support material and then removing the solvent or diluent by evaporation such as under reduced pressure. Alternatively, the transition metal compound can be dissolved in a solvent or diluent such as a hydrocarbon or tetrahydrofuran and spray dried to generate a well-shaped catalyst precursor having little or no silica or other inorganic solids content, if desired.

The preferred transition metal compounds are nickel compounds, titanium compounds, and cobalt compounds, with cobalt compounds and nickel compounds being the more preferred, and nickel compounds being most preferred.

Nickel Compounds. Nickel compounds of the transition metal component of the catalyst are organonickel compounds of nickel with mono- or bi-dentate organic ligands containing up to 20 carbon atoms. "Ligand" is defined as an ion or molecule bound to and considered bonded to a metal atom or ion. Mono-dentate means having one position through which covalent or co-ordinate bonds with the metal may be formed; bi-dentate means having two positions through which covalent or co-ordinate bonds with the metal may be formed. The organonickel compounds are generally soluble in inert solvents. Thus, any salt of an organic acid containing from about 1 to 20 carbon atoms may be employed.

Representative of organonickel compounds are nickel benzoate, nickel acetate, nickel naphthenate, nickel octanoate, nickel neodecanoate, nickel 2-ethylhexanoate, bis($\pi$-allyl nickel), bis($\pi$-cycloocta-1,5-diene), bis($\pi$-allyl nickel trifluoroacetate), bis($\alpha$-furyl dioxime) nickel, nickel palmitate, nickel stearate, nickel acetylacetonate, nickel salicylaldehyde, bis(salicylaldehyde) ethylene diimine nickel, bis(cyclopentadiene) nickel, cyclopentadienylnickel nitrosyl and nickel tetracarbonyl. The preferred transition metal component when a nickel compound is used is a nickel salt of a carboxylic acid or an organic complex compound of nickel.

Co-catalysts that can be employed when the transition metal component utilizes a nickel compound include triethylaluminum (TEAL), triisobutylaluminum (TIBA), diethyl aluminum chloride (DEAC), partially hydrolyzed DEAC, methylaluminoxane (MAO), or modified methylaluminoxane (MMAO).

Promoters that can be used with the transition metal component when it uses a nickel compound include hydrogen fluoride (HF), borontrifluoride ($BF_3$), either in their pure state or as a complex.

For HF or its complexes, the HF to Al mole ratio may be varied between 0.5:1 to 3.5:1, preferably 1:1 to 2.5:1, and most preferably 1.5:1 to 2.5:1. For $BF_3$ and its complexes, the $BF_3$ to Al mole ratio may be varied between 0.5:1 to 3:1, preferably 0.5:1 to 2:1, and most preferably is 0.6:1 to 1.5:1. The complexes are known and disclosed, for example, in U.S. Pat. Nos. 4,102,817 and 5,412,045. Typically, they are complexes formed between HF or $BF_3$ and molecule(s) from the following class or organic compounds: ether, alcohol, ketone, nitrile, carboxylic acid, ester, amine, and sulfide.

We have found that some type of catalyst pre-activation is preferred to obtain adequate catalyst activity in gas phase polymerizations of butadiene and isoprene using a nickel compound in the transition metal component of the rare earth-transition metal catalyst system of the invention. In the present invention a nickel transition metal component preferably is pre-activated by forming a reaction mixture of (i) an organonickel compound; (ii) an organoaluminum; (iii) at least one $BF_3$ or HF complex; and optionally (iv) water. In this pre-activated system, ingredients (i) through (iii) are mixed together in the presence of a small amount of at least one conjugated diolefin (v), and ingredient (iv), when used, is always added last to the reaction mixture. Ingredients (i), (ii), and (iii) can be mixed in any order in the presence of the diolefin (v) which can be the same as or different from the diene(s) to be polymerized. Preferably, the diolefin (v) is the same as at least one of the dienes being polymerized. Most preferably, the diolefin (v) is butadiene (usually 1,3-butadiene) or isoprene, and not a mixture of the two. Other diolefins which can be employed include polybutadiene, isoprene, polyisoprene, 1,3-cyclooctadiene, styrene, polystyrene, and styrene-butadiene rubber (SBR).

While the order of addition of the ingredients may be varied, it is advantageous to have the diolefin present when the nickel compound contacts the alkyl aluminum compound. Therefore, in the present invention, the diolefin (e.g., 1,3-butadiene) is either dissolved in at least one inert hydrocarbon or aromatic solvent or used in bulk as a solvent itself. Suitable solvents are known and can include, for example, hexane, isopentane, heptane, and toluene. Another solvent is generally not required when the diolefin is used as the solvent.

After the diolefin is dissolved, the most preferred order of addition is organoaluminum and organonickel compounds followed by the addition of the promoter ($BF_3$ or HF complex), and water is added last. Ambient temperature and pressure can be employed.

The amount of diolefin used, expressed as a mole ratio of conjugated diolefin (v) to nickel, for pre-activating can be within the range of about 1:1 to about 1,000:1, preferably about 5:1 to about 300:1, most preferably about 10:1 to about 150:1.

After a sufficient contact time, the active mixture (referred to as a prepoly solution) of the transition metal component utilizing the nickel compound can be fed to a polymerization reactor.

For maximum catalyst activity the prepoly solution should be allowed to age for at least one hour prior to use in a gas phase reactor. The prepoly solution has a shelf life of at least about one month. The prepoly solution of the active catalyst mixture can be fed to the reactor as a solution, isolated as a solid, or can be first placed on a suitable support and fed as a solid to the reactor. When fed to the gas phase reactor as a solution, the prepoly nickel solution is introduced to the reactor in accordance with procedures set forth in U.S. Pat. Nos. 5,317,036; 5,616,661 and/or U.S. Ser. No. 08/659,764 U.S. Pat. No. 5,693,727. When the active catalyst or active prepoly nickel solution is fed to the reactor, it has been found that passivation of the reactor with co-catalyst (i.e., one or more organoaluminum compounds) is not required; and that there is no need for a separate co-catalyst feed to the reactor during polymerization. Further, additional feeding of co-catalyst during polymerization did not result in any additional appreciable catalytic activity.

Cobalt Compounds. The cobalt compound can be any organic compound such as the cobalt salts of organic acids, cobalt complexes, and the like. Preferably, the cobalt compound is selected from the group consisting of cobalt 13-ketone complexes, for example, cobalt (II) acetylacetonate and cobalt (III) acetylacetonate; cobalt β-ketoacid ester complexes, for example, cobalt acetoacetic ethylester complexes; cobalt salts of organic carboxylic acids having 6 or more carbon atoms, for example, cobalt octoate, cobalt naphthenate, and cobalt benzoate; and cobalt halide complexes, for example, cobalt chloride-pyridine complexes; cobalt phosphine complexes; cobalt chloride-ethyl alcohol complexes and cobalt complexes coordinated with butadiene, for example, (1,3-butadiene) [1-(2-methyl-3-butenyl)-π-allyl]-cobalt which may be prepared, for example, by mixing a cobalt compound with an organic aluminum compound, organic lithium compound or alkyl magnesium compound and 1,3-butadiene. Other typical cobalt compounds are cobalt sorbate, cobalt adipate, cobalt 2-ethylhexoate, cobalt stearate, and the like compounds wherein the organic portion of the molecule contains about 5 to 20, preferably 8 to 18 carbon atoms and one or two carboxylic functions, as well as acetylacetonate.

The cobalt transition metal component may be prepared without a support by simple contact of the cobalt metal compound with a co-catalyst preferably MAO or MMAO to form a solution or slurry which is fed directly to the reactor. The Al to cobalt metal ratio in the preparation step may vary between 1:1 to 1000:1.

The cobalt compound can be impregnated on a support by means such as by dissolving the cobalt metal compound in a solvent or diluent such as a hydrocarbon or tetrahydrofuran in the presence of the support material (e.g., silica) and then removing the solvent or diluent by evaporation such as under reduced pressure. The amount of cobalt metal impregnated on the support can range between 0.1 and 1.0 millimole/g catalyst.

Co-catalysts that can be employed with the transition metal component employing a cobalt compound include ethylaluminum sesquichloride (EASC), ethylaluminum dichloride (EADC), diethylaluminum chloride (DEAC) or partially hydrolyzed diethylaluminum chloride (DEACO), MAO, and modified methylaluminoxane (MMAO), and mixtures thereof. The mole ratio of aluminum alkyl halildes (or Al) to cobalt may be varied between 10:1 to 150:1, preferably 20:1 to 100:1, and most preferably 30:1 to 80:1. Preferably, the co-catalyst is a branched or cyclic oligomeric poly(hydrocarbylaluminum oxide). Most preferably, the co-catalyst is an aluminoxane such as MAO or MMAO. The mole ratio of MAO or MMAO to cobalt can vary from 50:1 to 1000:1 but preferably is about 100:1 to 500:1.

Water in small amounts is used as a promoter with the transition metal component containing cobalt.

Titanium Compounds. The titanium compounds are employed and prepared analogously to the cobalt compounds and can be $TiCl_4$, $TiBr_4$, $TiI_4$, $Ti(OR)_4$ (wherein R is an alkyl radical), mono- and bis- cyclopentadienyl derivatives of titanium (III and IV) with the other ligands consisting of halide, alkoxide, phenoxide or carboxylate groups.

Co-catalysts that can be employed when the transition metal component utilizes a titanium compound include TEAL, TIBA, dialkylaluminum iodide, MAO or MMAO.

Promoters that can be used with the transition metal component containing a titanium compound include iodine, or organic ethers such as diphenylethers (DPE). For isoprene, preferably, the combination $TiCl_4$, TIBA, and DPE is employed.

Method of Using the Catalyst in a Polymerization Process. The rare earth component and transition metal component, can be added to the reactor separately or combined before addition to the reactor. The ratio of the rare earth component (e.g., Nd) to the transition metal component (Ni, Co, or Ti) can vary between about 0.1:1 to 10:1.

The co-catalyst can be added to either component independently, to the reactor separately, or to a premixture of the rare earth and transition metal components of the catalyst external to the reactor. The ratio of co-catalyst (as Al) to total catalyst (rare earth+transition metal) can vary between 1:1 and 5000:1. Preferably, it is between about 2:1 and 500:1. Either or both components can be pre-activated outside the reactor via a pre-polymerization step.

The catalyst(s) are fed to the gas phase reactor either in solution or supported on silica or carbon black in accordance with the polymerization procedures set forth below. The catalyst(s) can be activated before or after addition, or can be added as prepolymerized catalysts as well.

When using a cobalt transition metal component, the Al/(Nd+Co) mole ratio can vary from about 100:1 to 1000:1, preferably from about 300:1 to 600:1 using MAO. Lower Al/(Nd+Co) mole ratios, ranging from about 10:1 to 100:1, preferably from about 30:1 to 80:1, were used with EASC. The mole ratio of Nd:Co varied from 0.2:1 to 10:1, preferably from about 1.5:1 to 3:1. A titanium transition metal component has metal ratios analogous to that of the cobalt transition metal component. When using a nickel transition metal component, the Al/(Nd+Ni) mole ratio can vary from about 1:20 to 1:2000.

Using one or more prepolymerized catalyst components is a suitable way of utilizing catalysts together whose co-catalysts could be incompatible or otherwise deactivating each to the other. Pre-polymerized rare earth catalyst components (e.g., Nd catalysts) can be used in conjunction with a pre-polymerized cobalt catalyst component or a pre-polymerized nickel catalyst component. Alternatively, either of the two catalyst components can be pre-polymerized while the other is not pre-polymerized.

When using a rare earth catalyst component such as a neodymium catalyst component, a soluble pre-activated catalyst component was formed by combining the neodymium compound with the halogen source and the cocatalyst in ratio of Cl:Nd:Al ranging from about 0.5:1:50 to 5:1:150, preferably from about 1.5:1:40 to 3:1:80.

To pre-form a transition metal catalyst component such as a cobalt catalyst component, a cobalt compound was contacted with the co-catalyst in a molar ratio between about 10:1 to 1000:1, preferably from about 20:1 to 300:1. A titanium catalyst component is analogous to the cobalt catalyst component.

Pre-polymerization is also a convenient way to combine different catalytic systems to reach optimal efficiency at different aluminum to metal mole ratios. Pre-polymerized catalytic systems offer the advantage of using a common cocatalyst such as MAO for Nd-Co catalyst systems or to utilize different co-catalysts (e.g., TIBA and TEAL) for Nd-Ni catalyst systems.

Inert Particulate Material. Also referred to as flow aids or fluidization aids, inert particulate materials employed in the invention are chemically inert to the reaction. Such suitable materials are disclosed, for example, in U.S. Pat. No. 4,994,534. Examples of such inert particulate materials include carbon black, silica, clays, other like materials such as talc, and mixtures thereof. Organic polymeric materials can also be employed as a fluidization aid. Carbon blacks and silicas are the preferred fluidization aids with carbon black being the most preferred. The carbon black materials employed have a primary particle size of about 10 to 100 nanometers and an average size of aggregate (primary structure) of about 0.1 to about 10 microns. The specific surface area of the carbon black is about 30 to 1,500 m2/gm and the carbon black displays a dibutylphthalate (DBP) absorption of about 80 to about 350 cc/100 grams.

Silicas which can be employed are amorphous and have a primary particle size of about 5 to 50 nanometers and an average size of aggregate of about 0.1 to 10 microns. The average size of agglomerates of silica is about 2 to about 120 microns. The silicas employed have a specific surface area of about 50 to 500 m2/gm and a dibutylphthalate (DBP) absorption of about 100 to 400 cc/100 grams.

Clays which can be employed according to the invention have an average particle size of about 0.01 to about 10 microns and a specific surface area of about 3 to 30 m2/gm. They exhibit oil absorption of about 20 to about 100 gms per 100 gms.

Organic polymeric substances which can be used include polymers and copolymers of ethylene, propylene, butene, and other alpha olefins and polystyrene, in granular or powder form. These organic polymeric materials have an average particle size ranging from about 0.01 to 100 microns, preferably 0.01 to 10 microns.

In general, the amount of fluidization aid utilized generally depends on the type of material utilized and polymer produced. When employing carbon black or silica, or preferably a mixture of the two, as the fluidization aid, they can be used in amounts of about 0.3% to about 90% by weight, preferably about 5% to about 60%, and most preferably about 5% to about 45%, based on the weight of the final product (polybutadiene or polyisoprene) produced. When clays or talcs are employed as the fluidization aid, the amount can range from about 0.3% to about 80% based on the weight of the final product, preferably about 5% to 75% by weight. Organic polymeric materials are used in amounts of about 0.3% to about 50% by weight, preferably about 0.3% to about 10% based on the weight of the final polymer product produced.

The fluidization aid can be introduced into the reactor at or near the top of the reactor, at the bottom of the reactor, directly into the polymerization zone of the reactor, andlor to the recycle line directed into the bottom of the reactor. Preferably, the fluidization aid is introduced at or near the top of the reactor, above the fluidized bed, or near the top of the fluidized bed. It is preferred to treat the fluidization aid prior to entry into the reactor to remove traces of moisture and oxygen. This can be accomplished by purging the material with nitrogen gas and heating by conventional procedures. The fluidization aids can be added separately or combined with one or more monomers, and/or with the catalyst. Preferably, the fluidization aid is added separately.

Polymerization Procedures. The present invention is not limited to any specific type of stirred or fluidized gas phase polymerization reactor and can be carried out in a single reactor or multiple reactors (two or more reactors preferably connected in series). In addition to well-known conventional gas phase polymerizations processes, "condensed mode", including the so-called "induced condensed mode", and "liquid monomer" operation of a gas phase polymerization reactor can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Conventional gas phase polymerizations are disclosed, for example, in U.S. Pat. Nos. 3,922,322; 4,035,560; and 4,994,534. Optionally, and preferably, a conventional polymerization of the present invention is conducted in the presence of one or more inert particulate materials as described in U.S. Pat. No. 4,994,534.

Condensed mode polymerizations are disclosed in U.S. Pat. Nos. 4,543,399; 4,588,790; 4,994,534; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition to condensable fluids of the polymerization process itself, other condensable fluids, inert to the polymerization can be introduced to "induce" condensing mode operation. Examples of suitable condensable fluids may be selected from liquid saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly. Optionally, and preferably, inert particulate materials as described in U.S. Pat. No. 4,994,534 can be employed in condensing and/or induced mode polymerizations.

Liquid monomer polymerization mode is disclosed in U.S. Pat. No. 5,453,471; U.S. Serial No. 510,375; PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids, also known as inert particulate materials (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced.

In general, a liquid monomer process is conducted in a stirred bed or gas fluidized bed reaction vessel having a polymerization zone containing a bed of growing polymer particles. The process comprises continuously introducing a stream of one or more monomers and optionally one or more inert gases or liquids into the polymerization zone optionally in the presence of one or more inert particulate materials; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. Typically, the temperature within the zone and the velocity of gases passing through the zone are such that essentially no liquid is present in the polymerization zone that is not adsorbed on or absorbed in solid particulate matter. The use of fluidization aids is preferred in the liquid monomer process of the present invention. In view of the dew points or condensation temperatures of the dienes and vinyl-substituted aromatic compounds employed in the gas phase polymerization process of the present invention, liquid monomer mode is the preferred polymerization mode.

Generally, all of the above modes of polymerizing are carried out in a gas phase fluidized bed made up of or containing a "seed bed" of polymer which is the same or different from the polymer product being produced. The bed is preferably made up of the same granular resin that is to be produced in the reactor. Thus, during the course of the polymerization, the bed comprises formed polymer particles, growing polymer particles, and initiator particles fluidized by polymerizing and modifying gaseous components introduced at a flow rate or velocity sufficient to cause the particles to separate and act as a fluid.

The fluidizing gas is made up of the initial feed, make-up feed, and cycle (recycle) gas, i.e., monomers, and, if desired, modifiers and/or an inert carrier gas (e.g., nitrogen, argon, or inert hydrocarbon such as ethane, with nitrogen being preferred). A typical cycle gas is comprised of one or more monomers, nitrogen, and optionally hydrogen, either alone or in combination. The process can be carried out in a batch or continuous mode, the latter being preferred. The essential parts of the reactor are the vessel, the bed, the gas distribution plate, inlet and outlet piping, at least one compressor, at least one cycle gas cooler or heat exchanger, and a product discharge system. In the vessel, above the bed, there is a velocity reduction zone, and in the bed, a reaction zone. Both are above the gas distribution plate.

Variations in the reactor can be introduced if desired. One involves the relocation of one or more cycle gas compressors from upstream to downstream of the cooler and another involves the addition of a vent line from the top of the product discharge vessel (stirred tank product) back to the top of the reactor to improve the fill level of the product discharge vessel.

Polymerization can also be conducted by charging one monomer initially, allowing it to polymerize, and then adding a second monomer, and allowing it to polymerize in a single polymerization vessel. Alternatively, two or more polymerization vessels, preferably connected in series, can be used to polymerize with two or more monomers. Using multiple reactors, one monomer can be polymerized in the first reactor, and additional monomers can be polymerized in second or subsequent reactors. However, using a single reactor is the preferred way to polymerize the monomers employed in the inventive process.

In general the polymerization conditions in the gas phase reactor are such that the temperature ranges from about 0° to 120° C., preferably about 40° to 100° C., and most preferably about 60° to 80° C. Partial pressure will vary depending upon the particular monomer employed and the temperature of the polymerization, and it can range from about 1 to 100 psi. Condensation temperatures of the monomers are well known. In general, it is preferred to operate at a partial pressure slightly above to slightly below (that is, ±10° C.) the dew point of the monomer. For example, for butadiene and isoprene-butadiene, the partial pressure ranges from about 10 to about 100 psi; isoprene partial pressure ranges from about 10 to about 50 psi. For an isoprene polymerization in liquid monomer mode the liquid monomer (isoprene) is maintained at a concentration of about 1 to about 30 wt. % of isoprene monomer to polymer in the reactor. Total reactor pressure ranges from about 300 to about 500 psi. Typically, the polymers produced by the process of this invention have a space-time-yield ratio (STY) of about 1:10; preferably 1:3. That is, they generally require a longer residence time than alpha olefin polymerizations. The higher the space-time-yield ratio the faster the polymer product is produced in the reactor.

Other Additives. Some compounds may be used to neutralize static in the fluidized-bed reactor, others known as drivers rather than antistatic agents, may consistently force the static from positive to negative or from negative to positive. These methods of static control and compounds for controlling static are disclosed, for example, in U.S. Pat. Nos. 4,792,592; 4,803,251; 4,855,370; 4,876,320; 5,162,463; 5,194,526; 5,200,477 and 3,391,477. The use of these additives is well within the skill of those skilled in the art. These additives may be added to the reaction zone separately or in combination with one or more of the other reactants (monomers, fluidization aids, chain transfer agent, recycle gas, etc.).

Fouling of the recycle lines can be effectively controlled or halted by introducing veratrole (1,2-dimethoxy benzene), methanol, tetrahydrofuran, Atmer™ 163, or propylene glycol into the recycle lines at compressor junction in the reactor system. Reduction of fouling of the cycle gas line, compressor, and cycle gas cooler can typically be accomplished using a feed rate of about 5 lb/hr of a 0.1 wt % solution in isopentane.

All references cited herein are incorporated by reference.

Whereas the scope of the invention is set forth in the appended claims, the following specific examples illustrate certain aspects of the present invention. The examples are set forth for illustration only and are not to be construed as limitations on the invention, except as set forth in the claims. All parts and percentages are by weight unless otherwise specified.

EXAMPLES

All polymerizations and catalyst preparations are conducted under inert conditions.

1,3-Butadiene Polymerization Procedure:

The polymerization of 1,3-butadiene is carried out in gas phase according to the following procedure: A one liter stirred autoclave is charged with 32 grams of dry carbon black (N-650) used as flow aid (i.e., inert particulate material). The reactor is dried with a flow purge of $N_2$ at 90–100° C. Once the internal reactor temperature is adjusted to 50° C., aluminum alkyl (the same aluminum alkyl to be used as cocatalyst) is added to passivate the reactor. A measured amount of the catalyst is charged to the stirred reactor. The reactor is pressure purged with butadiene and the reactor is pressurized with 22 psig of monomer. The cocatalyst is then injected to start the polymerization. The monomer is continuously flowing to maintain the initial reactor pressure during the reaction time. The reaction is terminated by injection of a stabilizer package dissolved in alcohol. The weight of the granular, free-flowing, particulate black polymer corrected by ash content is used to determine the yield. The polymer microstructure is measured by infrared analysis and polymer molecular weight is measured using GPC analysis. Commercial grade polymer ranges in Mn between about 150,000 and 300,000 and has narrow molecular weight distributions (MWD), also known as dispersity indices ranging from about 2.0 to 4.5.

CASE 1: NON-PREPOLYMERIZED SYSTEMS

Neodymium-Cobalt Mixed Catalyst Systems

Example 1

Catalyst A: Silica Supported Co(II) Chloride/Pyridine Complex

1. Weigh 31.94 g of silica into into a 500 ml oven-dried airless flask.
2. Add 7.272 g $CoCl_2(Py)_4$, (FW: 447.24 g/mole).
3. Add 150 ml of $CH_2Cl_2$ and stir for 30 min.
4. Dry under high vacuum with a 25° C. water bath.

Calculated Co loading: 0.42 mmole Co/g solid.

Catalyst B: Silica supported Neodymium Versatate (Nd(ver)$_3$) Treated with Diethyl Aluminum Chloride (DEAC)

1. Weigh 12.67 g of (9 wt % Nd solution in hexane) Nd(ver)$_3$ (FW=658.01 g/mole) solution in a 100 ml oven-dried airless Schlenk flask provided with magnetic stir bar.
2. Add 50 ml of dry degassed n-hexane and stir.
3. Add 10.092 g of silica and stir 30 min at room temperature.
4. Dry in high vacuum for 3–4 hs at room temperature. Calculated Nd loading: 0.48 mmole Nd/g solid.
5. Add 50 ml of dry degassed n-hexane to another 100 ml oven-dried airless Schlenk flask provided with magnetic stir bar following with the addition of the solid from step 4.
6. Add 26.3 ml of DEAC (1.5 M solution in hexane) and stir 30 min at room temperature.
7. Dry in high vacuum for 3–4 h at room temperature. Calculated Nd loading in final catalyst: 0.39 mmole Nd/g solid. Calculated Cl loading in final catalyst: 1.97mmole Cl/g solid. Cl/Nd=5

Catalyst A and Catalyst B were added simultaneously to the reactor at metal mole ratio Nd/Co=1.66. A carbon black (CB) bed was already passivated with MAO. Additional MAO was added as cocatalyst to a mole ratio Al/(Nd+Co)= 540. Polymer with a dispersity index of greater than 4 was produced with a molecular weight within commercial range.

Example 2

Catalyst C: Silica Supported Co(II) Octoate $(CO(oct)_2)$

1. Weigh 4.40g of silica into into a 100 ml oven-dried airless Schlenk flask.
2. Add 25ml of dry degassed hexane.
3. Then add 0.70g of $Co(oct)_2$ (FW=345.37g/mole).
4. And then stir for 30 minutes under nitrogen.
5. Vacuum dry the product at 65° C. using a warm water bath for 2–3 hours.

Calculated Co loading: 0.39 mmole Co/g solid.

Catalyst D: Silica Supported Nd Octoate $(Nd(oct)_3)$

1. Weigh 1.931g of $Nd(oct)_3$ solid (FW=576.83 g/mole) into a 100 ml oven-dried airless Schlenk flask and place it under nitrogen.
2. Add 30 ml of freshly distilled THF and stir until the neodymium compound dissolves.
3. Add 3.040 g of silica and stir for 30 minutes.
4. Dry under high vacuum using a warm water bath for 3–4hrs.

Calculated Nd loading: 0.66 mmole Nd/g solid.

Catalyst C and Catalyst D were mixed together at a mole ratio Nd/Co=1.66 and used to polymerize butadiene in conjunction with EASC. The mixture of catalysts was added to a reactor containing a carbon black (CB) bed already passivated with EASC. Additional EASC was added as cocatalyst to a mole ratio Al/(Nd+Co)=50. A polymer with broad MWD was obtained.

Example 3

Catalyst E: π Allyl-Nd Cl Complex Slurried with Methyl Aluminoxane (MAO) and Silica.

a) Preparation of $NdCl_3.(THF)_2$ Complex:

1. Weigh 10.12 g of $NdCl_3$ into a 200 ml oven-dried airless Schlenk flask equipped with condenser and kept under nitrogen.
2. Add 100 ml of distilled THF.
3. Reflux during 12 hours.
4. Stir 24 hours at room temperature.
5. Dry with high vacuum.

Measured Cl content: 9.69 mmole Cl/g.
FW NdCl$_3$.(THF)$_2$ complex: 394.81grams/mole complex.
  b) Preparation of Nd allyl Complex:
1. Weigh 2.554 g of NdCl$_3$.(THF)$_2$ into a 100 ml oven-dried airless Schlenk flask.
2. Add 30 ml of distilled THF.
3. Add 3.9 ml/g NdCl$_3$.(THF)$_2$ of 2.0 M solution of allyl-magnesium chloride.
4. Stir 20 minutes in ice bath under nitrogen.
5. Stir additional 20 minutes at room temperature.
6. Dry with high vacuum during 12 hours.
7. Keep the π allyl-Nd Cl complex in the dry box. Measured Nd loading: 2.78 mmole Nd/g complex.
  c) Preparation of Slurry of π allyl-Nd Cl Complex with MAO and Silica:
1. Weigh 0.162 g of π Allyl-Nd Cl complex in an oven-dried airless Schlenk flask provided with magnetic stir bar.
2. Add 0.251 g of silica.
3. Add 4.3 ml of distilled toluene.
4. Add 4.2 ml of (1.67 M) MAO solution, and stir. Keep slurry in dry box.
The slurry contains 0.021 mmole Nd/ml and mole ratio MAO/Nd=334.

Catalyst A (slurried with MAO in toluene at mole ratio Al/Co=100) was used in conjunction with Catalyst E. The metals mole ratio was Nd/Co=2. Cobalt based catalyst was first added to a reactor containing a CB bed already passivated with MAO. Additional MAO was added as cocatalyst to a mole ratio Al/(Nd+Co)=330. The π-allyl neodymium catalyst was added via syringe injection to the on-going polymerization. The resulting polymer has a very high molecular weight and a narrow MWD.

Example 4

Catalyst A and Catalyst D silica supported Nd octoate catalysts were mixed together at mole ratio Nd/Co=1.66 and used to polmerize butadiene. The mixture of catalysts was added to a reactor containing a CB bed already passivated with EASC. Additional EASC was added as cocatalyst up to a mole ratio Al/(Nd+Co)=50. A polymer with broad MWD was obtained.

CASE 2. PRE-POLYMERIZED SYSTEMS

Pre-polymerized Neodymium and Cobalt Catalysts

Example 6

Catalyst F: Prepolymerized CoCl$_2$(Py)$_4$ with MAO.
1. Weigh 0.030 g of ClCoCl2(Py)$_4$ complex in a 1 oz oven-dried airless crimp top bottle provided with magnetic stir bar.
2. Add 10 ml of (1.67 M) MAO solution in toluene.
3. Add 10 ml of distilled toluene and stir.
4. Add 0.4 g of 1,3-butadiene to the bottle immersed in an ice bath and stir.
5. A prepolymer is obtained containing 0.034 mmole Co/ml.
The prepolymerized solution is kept in a cold room (5° C.).
Catalyst G: Prepolymerized Soluble Nd(ver)3 with Di-ethyl Aluminum Chloride (DEAC) and MAO.
1. Weigh 1 g (1.3 ml) of (4.76 wt % Nd) Nd(ver)$_3$ solution in a 1 oz oven-dried airless crimp top bottle provided with magnetic stir bar.
2. Add 0.33 ml of 1.5 M DEAC solution.
3. Add 8.4 ml of dry degassed n-hexane and stir. The solution contains 0.033 mmole Nd/ml.
4. Add 4 ml of the solution prepared above to a 1 oz oven-dried airless crimp top bottle provided with magnetic stir bar.
5. Add 1.3 ml of distilled toluene.
6. Add 15 ml of (1.8 M) MAO solution and stir. The mole ratio composition of the solution is Cl:Nd:Al=1.5:1:200.
7. Add 0.10 g of 1,3-butadiene to the bottle immersed in an ice bath and stir.
8. A prepolymer is obtained containing 0.0065 mmole Nd/ml and mole ratio BD/Nd=14.
The prepolymerized solution is kept in a cold room(5° C.).

Catalyst F and Catalyst G, both pre-polymerized catalysts were fresh when used to polymerize butadiene in the gas phase using metal mole ratio Nd/Co=1. Catalyst F was loaded first to the reactor already passivated with MAO, through three consecutive injections which initiated the reaction and then followed by the Catalyst G addition. No additional MAO was added. After one hour polymerization, the resulting product contained commercial range MW and broad MWD.

| Example No. | Nd mmole | Co mmole | Cocatalyst Type/mmole | | Productivity (*) | Mn x 1000 | Mw x 1000 | MWD | Cis % |
|---|---|---|---|---|---|---|---|---|---|
| 1 | 0.052 | 0.030 | MAO | 44.7 | 80 | 53 | 228 | 428 | — |
| 2 | 0.050 | 0.030 | EASC | 4.0 | 140 | 45 | 413 | 9.15 | 94.0 |
| 3 | 0.080 | 0.032 | MAO | 37 | 110 | 749 | 1586 | 2.1 | 89.0 |
| 4 | 0.051 | 0.030 | EASC | 4.0 | 225 | 51 | 357 | 7.1 | 94.8 |

(*): g BR/mmole (Nd + Co)/h
Run Conditions: T = 50° C., pBD = 37 psia, run time = 1 hour Neodymium and Titanium Catalysts

Example 5

Cyclopentadienyltitanium trichloride is slurried with MAO in toluene at mole ratio Al/Ti=1000 and is used in conjunction with Catalyst E. The metals mole ratio was Nd/Ti=1. Both catalysts are slurried together with cocatalyst and then added to a reactor containing CB bed already passivated with MAO. Additional MAO is added as cocatalyst up to a molar ratio Al/(Nd+Ti)=500. The polymerization is conducted as in that described in the above table. The resulting polymer is isolated.

Example 7

The experiment is the same as Example 6, except that both pre-polymerized catalysts were aged for two days at low temperature when used again. The polymer produced with the mixed pre-polymerized catalysts has high MW and narrow MWD.

Example 8

Catalyst H: Silica Supported Co Acetylacetonate (Co(acac)$_3$)
1. Weigh 80.414 g of silica into into a 500 ml oven-dried airless Schlenk flask.
2. Add 14.441 g of Co(acac)$_3$ (FW: 356.26 g/mole).
3. Add 300 ml of freshly distilled THF and stir for 30 min.

4. Dry under high vacuum.
Calculated Co loading: 0.42 mmole Co/g solid.

Catalyst H was loaded first to the reactor containing a CB bed passivated with MAO. Additional MAO was added prior the introduction of the Catalyst G. The pre-polymerized catalysts had been aged for one day at low temperature when used.

| Example No. | Nd mmole | Co mmole | Cocatalyst Type/ mmole | | Productivity (*) | Mn × 1000 | Mw × 1000 | MWD | Cis % |
|---|---|---|---|---|---|---|---|---|---|
| 6 | 0.034 | 0.030 | MAO | 16 | 130 | 166 | 926 | 5.6 | 97.3 |
| 7 | 0.044 | 0.030 | MAO | 16 | 110 | 647 | 1453 | 2.3 | 98.3 |
| 8 | 0.026 | 0.033 | MAO | 9 | 170 | 690 | 1300 | 2 | 94.8 |

(*):gBR/mmole (Nd + Co)/h
Run Conditions: T = 50° C., pBD = 37 psia, run time = 1 hour Pre-polymerized Neodymium and Nickel Catalysts

Example 9

Catalyst I: Prepolymerized Soluble Ni (II) Octoate $(Ni(oct)_2)$, Tri-ethyl Aluminum (TEAL) and Boron Tri-fluoride-di-ethyl Etherate $(BF_3.Et_2O)$.

a) Preparation of $Ni(oct)_2$ Solution in Toluene:
1. Weigh 0.225 g of $Ni(oct)_2$ to a 25 ml oven-dried airless volumetric flask.
2. Add 25 ml of distilled toluene and stir. The Ni(oct)2 solution contains 0.026 mmole Ni/ml.

b) Preparation of Prepolymerized Catalyst:
1. Add 18.92 ml of dry degassed n-hexane to a 1 oz oven-dried airless crimp top flask provided with magnetic stir bar.
2. Add 2.53 g of 1,3-butadiene to the bottle immersed in an ice bath and stir.
3. Add 2 ml of (1.54 M) TEAL solution in hexane.
4. Add 6 ml of toluene solution of $Ni(oct)_2$ prepared in a).
5. Add 1.56 ml of (2.0 M) $BF_3.Et_2O$ solution and stir.

The prepolymerized solution contains 0.0055 mmole Ni/ml and mole ratio $Al:Ni:BF_3=20:1:20$.

Catalyst I was used for butadiene polymerization in conjunction with soluble Catalyst E at metals mole ratio Nd/Ni=0.5. No additional cocatalyst was added. Polymer with broad MWD was produced.

Example 10

Catalyst J: Prepolymerized Soluble Nd(ver)3 with Ethyl Aluminum Sesquichloride (EASC) and Tri-i-butyl Aluminum (TIBA).
2. Weigh 1 g (1.3 ml) of (4.76 wt % Nd) Nd(ver)3 solution in a 1 oz oven-dried airless crimp top bottle provided with magnetic stir bar.
3. Add 11.5 ml of (0.87 M) TIBA solution in hexane.
4. Add 0.22 ml of (1.5 M) EASC solution in hexane.
5. Add 2 ml of dry degassed n-hexane and stir. The solution contains 0.022 mmole Nd/ml.
6. Add 6 ml of the solution prepared above to a 1 oz oven-dried airless crimp top bottle provided with magnetic stir bar.
7. Add 14 ml of of dry degassed n-hexane and stir.
8. Add 0.90 g of 1,3-butadiene to the bottle immersed in an ice bath and stir.
9. A prepolymer is obtained containing 0.0066 mmole Nd/ml and Cl:Nd:Al=1.5:1:35 and BD/Nd=10.

The prepolymerized solution is kept in a cold room (5° C.).

Catalyst I was loaded to the reactor first, through a sequence of syringe injections, with no prior aluminum alkyl passivation of the CB bed. This catalyst was used for butadiene polymerization in conjunction with Catalyst J. The metals mole ratio was Nd/Ni=0.5. No additional cocatalyst was added. Polymer with broad MWD was produced.

Example 11

The Catalyst J was loaded to the reactor first, through syringe injection, with prior passivation of the CB bed with TEAL. This catalyst was used for butadiene polymerization in conjunction with Catalyst I. The metals mole ratio was Nd/Ni=1.0:1.0. No additional cocatalyst was added. Polymer with broad MWWD was produced.

Example 12

Catalyst I was loaded to the reactor first, through a sequence of syringe injections, with no prior aluminum alkyl passivation of the CB bed. This catalyst was used for butadiene polymerization in conjunction with Catalyst J. The metals mole ratio was Nd/Ni=1.0:1.0. No additional cocatalyst was added. Polymer with high MW broad MWD was produced.

Example 13

Catalyst K: Prepolymerized Soluble Nd(ver)3 with Ethyl Aluminum Sesquichloride (EASC) and Tri-ethyl Aluminum (TEAL).
1. Weigh 1 g (1.3 ml) of (4.76 wt % Nd) Nd(ver)3 solution in a 1 oz oven-dried airless crimp top bottle provided with magnetic stir bar.
2. Add 7.5 ml of (1.5 M) of TEAL solution in hexane.
3. Add 0.22 ml of (1.5 M) EASC solution in hexane. The solution contains 0.037 mmole Nd/ml.
4. Add 6 ml of the solution prepared above to a 1 oz oven-dried airless crimp top bottle provided with magnetic stir bar.
5. Add 14 ml of of dry degassed n-hexane and stir.
6. Add 1.90 g of 1,3-butadiene to the bottle immersed in an ice bath and stir.
7. A prepolymer is obtained containing 0.011 mmole Nd/ml, Cl:Nd:Al=35 and BD/Nd=160.

The prepolymerized solution is kept in a cold room (5° C.).

Catalyst I was loaded to the reactor first, through a sequence of syringe injections, with no prior aluminum alkyl passivation of the CB bed. This catalyst was used for butadiene polymerization in conjunction with Catalyst K. The metals mole ratio of both re-polymerized catalysts was Nd/Ni=1.0:0.6. Polymer with high MW and narrow MWD was produced.

Example 14

Catalyst K was loaded to the reactor first, through a sequence of syringe injections, with no prior aluminum alkyl passivation of the CB bed. This catalyst was used for butadiene polymerization in conjunction Catalyst I. The metals mole ratio of both pre-polymerized catalysts was Nd/Ni=1.0:0.6. Polymer with high MW and narrow MWD was produced.

| Example No. | Nd mmole | Ni mmole | Cocatalyst Type/mmole | Productivity (*) | Mn × 1000 | Mw × 1000 | MWD | Cis % |
|---|---|---|---|---|---|---|---|---|
| 9  | 0.024 | 0.048 | None   | 265 | 81  | 500  | 6.1  | 97.2 |
| 10 | 0.024 | 0.048 | None   | 275 | 126 | 711  | 5.7  | 97.6 |
| 11 | 0.050 | 0.050 | TEAL 3 | 105 | 62  | 416  | 6.7  | 91.6 |
| 12 | 0.050 | 0.050 | None   | 135 | 160 | 915  | 5.7  | 97.7 |
| 13 | 0.050 | 0.030 | None   | 175 | 487 | 1240 | 2.56 | 97.7 |
| 14 | 0.050 | 0.030 | None   | 225 | 580 | 1356 | 2.3  | 94.6 |

(*):gBR/mmole (Nd + Ni)/h
Run Conditions: T = 50° C., pBD = 37 psia, run time = 1 hour

What is claimed is:

1. A resin particle which is granular and free-flowing comprising an outer shell having a mixture of an inert particulate material and a polymer selected from the group consisting of polybutadiene, polyisoprene, or a copolymer of butadiene and isoprene; said inert particulate material being present in said outer shell in an amount higher than 75% by weight based on the weight of said outer shell; and an inner core having a mixture of said polymer and said inert particulate material, said polymer being present in the inner core in an amount higher than 90% by weight based on the weight of said inner core; and wherein the resin particle has a residue of rare earth metal ranging from about 10 to 400 ppm based upon the total polymer and a residue of a transition metal selected from the group consisting of nickel, cobalt, titanium and mixtures thereof ranging from about 1 to 120 ppm based upon the total polymer.

2. The resin particle of claim 1 wherein the polymer has a weighted average molecular weight of about 200,000 to 2,000,000 and a dispersity index of about 3 and 20; and wherein the inert particulate material is selected from the group consisting of carbon black, silica, and mixtures thereof.

* * * * *